United States Patent [19]

Nakano et al.

[11] Patent Number: 5,043,371
[45] Date of Patent: Aug. 27, 1991

[54] FLAME-RETARDANT POLYBUTYLENE TEREPHTHALATE RESIN COMPOSITION AND MOLDED ARTICLE FOR ELECTRICAL COMPONENT

[75] Inventors: Michio Nakano, Fuji; Hirouki Amono, Shimizu; Hiroshi Nakatsuji, Fuji, all of Japan

[73] Assignee: Polyplastics Co., Ltd., Osaka, Japan

[21] Appl. No.: 309,867

[22] Filed: Feb. 14, 1989

[30] Foreign Application Priority Data

Mar. 2, 1988 [JP] Japan ................................ 63-49337

[51] Int. Cl.$^5$ .............................................. C08K 5/34
[52] U.S. Cl. ...................................... 524/86; 524/87; 524/94
[58] Field of Search ............................. 524/86, 87, 94

[56] References Cited
U.S. PATENT DOCUMENTS

| | | | |
|---|---|---|---|
| 3,671,487 | 6/1972 | Abolins | 260/873 |
| 3,950,301 | 4/1976 | Balog et al. | 525/411 X |
| 4,119,607 | 10/1978 | Gergen et al. | 525/169 X |
| 4,313,903 | 2/1982 | Bier | 264/328 |
| 4,344,878 | 8/1982 | Dolce | 260/45.75 |
| 4,373,047 | 2/1983 | Cohen et al. | 525/177 |
| 4,374,220 | 2/1983 | Sonnenberg | 260/45 |
| 4,399,244 | 8/1983 | Bier | 260/40 |

FOREIGN PATENT DOCUMENTS 0111179 6/1984 European Pat. Off. .
0225645 6/1987 European Pat. Off. .

OTHER PUBLICATIONS

Plastics Engineering, vol. 43, No. 7, Jul. 1987, pp. 39-41, Brookfield Center, Conn., U.S.; L. Bourland: "Ultra-high-flow PP Speeds Up PET Crystallization".

Primary Examiner—Joseph L. Schofer
Assistant Examiner—J. M. Reddick
Attorney, Agent, or Firm—Nixon & Vanderhye

[57] ABSTRACT

A resin composition comprises a polybutylene terephthalate, a halogenated bisimide having the formula (1) and a polytetrafluoroethylene resin and is improved in flame retardancy and at the same time moulding properties. It is useful for parts of electric instruments.

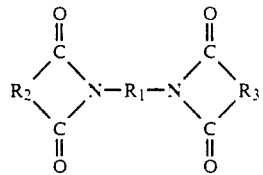

5 Claims, No Drawings

FLAME-RETARDANT POLYBUTYLENE TEREPHTHALATE RESIN COMPOSITION AND MOLDED ARTICLE FOR ELECTRICAL COMPONENT

FIELD OF INVENTION

The invention relates to a polybutylene terephthalate composition having excellent flame retardancy and well-balanced performance characteristics. The compositions of this invention show improvements in moldability (e.g., flow molding cycle, prevention of mold staining, etc.) and prevent the staining of metals when used for electrical components and the like.

BACKGROUND AND SUMMARY OF THE INVENTION

Polybutylene terephthalate and copolymers composed of at least 80% by weight of polybutylene terephthalate (hereinafter generically referred to as "PBT") have been used as engineering plastics for widespread applications, such as automobiles and electrical and electronic equipment, because they are crystalline thermoplastic resins exhibiting excellent mechanical and electrical properties as well as well as excellent physical and chemical characteristics.

PBT resin compositions compounded with organohalogen flame retardants or flame-retardant assistants for the purpose of imparting flame retardancy have been used previously for applications where flame retardancy is required, such as to from electrical components.

However, known PBT resin compositions compounded with flame retardants and flame-retardant assistants have the following problems.

(1) The presence of a flame retardant and an assistant lowers the physical properties of molded articles.

(2) PBT decomposes and deteriorates during the preparation of a composition or molding due to the interaction of a flame retardant and an assistant.

(3) A flame retardant and an assistant in addition to decomposition by-products thereof cause molds to corrode and stain so that the dimensional accuracy of molded articles and fabrication efficiency are lowered.

(4) A flame retardant and an assistant in addition to decomposition by-products thereof bring about the formation of spots on molded articles which spoil the appearance and performance of the same.

(5) Poor compatibility of a flame retardant with the resin brings about oozing of the flame retardant on the surface of a molded article to cause various problems.

(6) The flow of the resin is kindered, so that it becomes difficult to conduct molding.

(7) When a molded article is used, a flame retardant and an assistant used therewith or by-products of the decomposition thereof corrode or stain a metal in contact therewith or present in the vicinity thereof, which hinders the functions of electrical components. For example, when a molded article is used in electrical components having electric contacts made of a metal (e.g., housings or boards of switches, relays, etc.), there occurs various problems including a remarkable increase in the electrical resistance of the contact resulting from the staining of the contact metal during the long-term use thereof.

Various proposals have been made in order to solve these problems. However, it was very difficult to prepare a flame-retardant PBT composition capable of solving all of the above-described problems even though it was possible to solve part of the problems. Therefore, the development of a flame-retardant PBT composition capable of solving all of the above-described problems has eagerly been desired.

In general, the molding of polybutylene terephthalate is relatively easy as compared with that of polyethylene terephthalate. However, in recent years, there are many cases where a further reduction in the production cost of molded articles is desired. In particular, there is an increasing demand for the enhancement of productivity through shortening of the molding cycle (i.e., the so-called high-cycle molding). In general, the present invention is directed to a before "flame-retardant"; flame-retardant PBT composition which has excellent flame retardancy and well-balanced performance characteristics and is free from the above-described drawbacks. Particularly, the compositions of the present invention shorten the molding cycle and the realization of the high-cycle molding and causes no problems with respect to mold staining.

Specifically, the present invention relates to a flame-retardant polybutylene terephthalate resin composition comprising:

(A) polybutylene terephthalate or a copolymer composed of at least 80% by weight of polybutylene terephthalate;

(B) 0.5 to 25% by weight, based on the composition, of a halogenated bisimide represented by the general formula (1):

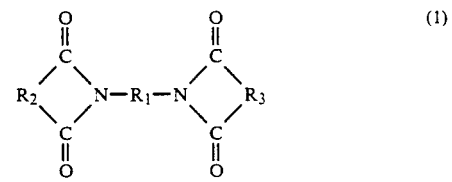

wherein $R_1$ is a divalent organic group and $R_2$ and $R_3$ are each a divalent organic group, provided that at least one of $R_2$ and $R_3$ has at least one halogen atom;

(C) 0.05 to 5% by weight, based on the composition, of a polytetrafluoroethylene resin; and (D) 0 to 60% by weight, based on the composition, of an inorganic filler.

In addition, the present invention provides a PBT composition having desired performance and effects further improved by incorporating an olefinic polymer (E) and/or a stabilizer (F) to the abovementioned fundamental components.

DETAILED DESCRIPTION OF THE INVENTION

The components constituting the composition of the present invention will now be described in more detail.

First of all, the PBT resin to be used as component (A) in the present invention is polybutylene terephthalate prepared by polycondensation of 1,4-butanediol with terephthalic acid or a lower alcohol ester thereof and may be a copolymer composed of 80% by weight of polybutylene terephthalate. Examples of the comonomer include aliphatic and aromatic polybasic acids, such as isophthalic acid, naphthalenedicarboxylic acid, adipic acid, sebacic acid, trimellitic acid and succinic acid, or ester forming derivatives thereof; lower alkylene glycols such as 1,3-propanediol, 1,6-hexanediol, and 1,8-octanediol; aromatic alcohols such as bisphenol A and 4,4'-dihydroxybiphenyl; an adduct of an alcohol with an alkylene oxide, such as an adduct of bisphenol A with 2 mol of propylene oxide; and polyhydroxy compounds, such as glycerin and pentaerythritol, or ester forming derivatives thereof.

Polybutylene terephthalate is particularly preferable.

In the present invention, the halogenated bisimide as component (B) to be compounded with the PBT resin as component (A) is a compound represented by the following general formula (1):

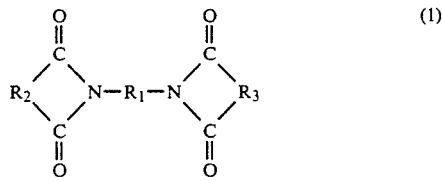

$R_1$ is a divalent organic group such as an alkylene, preferably having 1 to 25 carbon atoms, and an arylene, preferably having 6 to 0 carbon atoms. More preferable is an alkylene having 1 to 6 carbon atoms. Examples thereof include methylene, ethylene, 1,4-butylene, 1,6-hexamethylene, phenylene, 4,4'-methylenediphenylene, 4,4'-oxydiphenylene, xylylene, tetrachloroxylylene, and tetrabromoxylylene. Among them, ethylene, butylene, and hexamethylene are preferable. At least one, preferably both of $R_2$ and $R_3$ are a divalent organic group having at least one halogen atom, preferably a divalent halogenated aromatic group and generally a divalent phenylene group having 1 to 4 halogen atoms. The halogen is preferably bromo, particularly preferably 4-bromophenylene group.

Examples of the bisimide represented by the formula (1) as component (B) include the following compounds:

N,N'-(p- and m-phenylene)-bis[3,4,5,6-tetrachlorophthalimide], N,N'-(p- and m-phenylene)-bis[3,4,5,6-tetrabromophthalimide], N,N'-(methylene-di-p-phenylene)-bis[3,4,5,6-tetrachlorophthalimide], N,N'-(methylene-di-p-phenylene)-bis[3,4,5,6-tetrabromophthalimide], N,N'-(oxy-di-p-phenylene)-bis[3,4,5,6-tetrachlorophthalimide], N,N'-(oxy-di-p-phenylene)-bis[ 3,4,5,6-tetrabromophthalimide], N,N'-(p- and m-phenylene)-bischloroendoimide, *N,N'-(p- and m-tetrachloroxylylene)-bis[3,4,5,6-tetrachlorophthalimide], *N,N'-(p- and m-tetrachloroxylylene)bis[3,4,5,6-tetrabromophthalimide], *N,N'-(p- and m-tetrachloroxylylene)-bischloroendoimide, N,N'-(1,2-ethylene)-bischloroendoimide, N,N'-(1 2-ethylene)-bis[3,4,5,6-tetrabromophthalimide], N,N'-bis(1,2,3,4,5-pentabromobenzyl)-pyromellitimide, and N,N'-bis(2,4,6-tribromophenyl)-pyromellitimide.

With respect to the compounds marked with *, the tetrahaloxylene group is 1,2,4,5-tetrahaloxylylene or 1,3,4,5-tetrahaloxylylene.

Among them, a lower alkylenebistetrabromophthalimide is preferable, and N,N'-ethylenebistetrabromophthalimide is particularly preferable.

The content of component (B) is 0.5 to 25% by weight, preferably 1 to 15% by weight based on the total amount of the composition. When the content is too large, mechanical and physical properties, thermal stability, etc. are lowered, so that the appearance of the resin is spoiled. On the other hand, when it is too small, not only the flame retardancy becomes unsatisfactory but also no sufficient effect can be attained with respect to the high cycle moldability derived from the synergistic effect attained by a combination with the other component(s).

In the present invention, ti is preferred to use component B) in combination with a flame-retardant assistant.

Examples of the flame-retardant assistant include metallic oxides and hydroxides such as antimony triodixe, antimony halide, aluminum hydroxide, and magnesium hydroxide. The flame-retardant assistant is added in an amount of 0 to 15% by weight, preferably 1 to 10% by weight based on the total amount of the composition.

The polytetrafluoroethylene resin as component (C) to be used in the present invention can be prepared by known processes and is easily commercially available. In general, this resin is a white solid prepared by polymerization of tetrafluoroethylene in an aqueous medium in the presence of a radical catalyst. Polytetrafluoroethylene as component (C) may be one having any degree of polymerization (viscosity) selected according to fabricability, dispersibility, and other physical properties of the composition. The particle diameter as well is widely adjustable from 0.05 μm to several millimeters. Further, it is also possible to use polytetrafluoroethylene having any shape from granule to fiber. With respect to the above-described shape and particle diameter, suitable shape and size may be experimentally selected depending upon the fabricability and the intended property and effect of the composition. The amount of incorporation of component (C) is 0.05 to 5% by weight, preferably 0.05 to 3% by weight based on the total amount of the composition. When the amount of component (C) is too small, the flame retardancy becomes unsatisfactory in connection with other components, and in particular no sufficient improvement can be attained in the dripping as determined by the combustion test according to UL-94, while when it is too large, the physical properties are unfavorably lowered due to poor dispersion.

The feature of the present invention resides in a synergistic effect attained by a combination of the following three components, i.e., (A) PBT, (B) halogenated bisimide, and (C) tetrafluoroethylene. The effect of the present invention cannot be attained when any one of the above-described three components is absent or replaced by other substance.

That is, a combined use of a flame retardant as component (B) and polytetrafluoroethylene as component (C) according to the present invention brings about the formation of a composition having various advantages such as an ability to impart excellent flame retardancy to crystalline PBT, freedom from dripping, excellent dispersion among the three components, freedom from the occurrence of spots on the surface of a molded article as opposed to other flame-retardant compositions liable to bring about such unfavorable phenomena, excellent mechanical properties, freedom from the occurrence of separation and deposition of each component during fabrication or use at a high temperature, and freedom from corrosion of metal by virtue of excellent stability because of little or no occurrence of decomposition and deterioration of each component.

The flame-retardant PBT composition comprising components (A), (B), and (C) has advantages such as an effect of increasing the rate of solidification of the PBT resin through the rise of the crystallization temperature and acceleration of crystallization during solidification by virtue of the coexistence of components (B) and (C), excellent flow, little or no occurrence of deposition and corrosion on a mold, and an effect of enabling high cycle molding through great contribution to shortening of the molding cycle. The above-described advantages can be attained by synergism of components (A), (B), and (C) according to the present invention. Therefore, for example, a polyester elastomer wherein a large amount of polyoxyalkylene glycol is used as a monomer cannot exhibit any effect of shortening the molding cycle even when the same polyester is used as component (A).

Next, with respect to the inorganic filler as component (D), it is preferable to incorporate this component for the purpose of preparing a molded article having excellent performance with respect to mechanical strengths, heat resistance, dimensional stability (resistance to deformation and warping) and electrical properties, and fibrous, granulated and flaky fillers may be used depending upon the intended purposes.

Examples of the fibrous filler include inorganic fibrous materials, e.g., glass fiber, carbon fiber, silica fiber, silica-alumina fiber, zirconia fiber, boron nitride fiber, silicon nitride fiber, boron fiber, potassium titanate fiber, and fibrous materials of metals such as stainless steel, aluminum, titanium, copper, and brass. Representative examples of the fibrous filler include a glass fiber and a carbon fiber. It is also possible to sue high-melting organic fibrous materials such as polyamide and acrylic resin.

Examples of the particulate filler include carbon black, silica, ground quartz, glass bead, glass powder, silicates such as calcium silicate, aluminum silicate, kaolin, talc, clay, diatomaceous earth and wollastonite, metallic oxides such as iron oxide, titanium oxide, zinc oxide and alumina, metal carbonates such as calcium carbonate and magnesium carbonate, metal sulfates such as calcium sulfate and barium sulfate, and other fillers such as silicon carbide, silicon nitride, boron nitride and various metallic powders.

Examples of the flaky inorganic material include mica, glass flake, and various metallic foils.

The above-described inorganic fillers can be used clone or in a combination of two or more of them. A combined use of a fibrous filler, particularly a glass fiber, with a granular and/or flaky filler is preferable for attaining a combination of mechanical strengths with dimensional accuracy, electrical properties, etc.

If necessary, it is preferable to use the above-described fillers in combination with a sizing agent or a surface treatment. Examples of the compound used for this purpose include functional compounds such as epoxy compounds, isocyanate compounds, silane compounds, and titanate compounds. These compounds may be used by previously conducting surface treatment or sizing treatment. Alternatively, they may be added together with other components when the components are mixed with each other.

In the present invention, the amount of incorporation of the above-described inorganic filler is 0 to 60% by weight, preferably 5 to 50% by weight based on the total amount of the composition. When this amount exceeds 60% by weight, not only it becomes difficult to conduct fabrication but also there occurs a problem with respect to the mechanical strengths of a molded article. The amount of the functional surface treatment used in combination with the inorganic filler is 0 to 10% by weight, preferably 0.05 to 5% by weight.

Even when the composition of the present invention is used as it is, it has mechanical properties and thermal stability superior to those of known flame retardant-containing PBT compositions and it can exert a remarkable effect on the molding cycle and the prevention of staining of metal. However, a further improved effect can be attained when the above-described components (A) and (D) are used in combination with an olefinic polymer as component (E) and/or an amine or amide stabilizer as component (F).

The term "olefinic polymer" as component (E) used herein is intended to mean any polymer or copolymer mainly composed of constituent units comprising an olefin, and examples thereof include polyethylene, polypropylene and modifications thereof and copolymers, such as ethylene/propylene, ethylene/vinyl acetate, ethylene/acrylic ester and ethylene/acrylic acid copolymers, and modifications thereof. In particular, it is preferable from the viewpoint of attaining the purpose of the present invention that these olefinic polymers have low molecular weights. Further, it is more preferable that they be waxy which are poor in itself in the moldability. The amount of incorporation of the olefinic polymer is 0.05 to 5% by weight, preferably 0.1 to 3% by weight based on the composition.

When the above-described olefinic polymer is used in combination with a particular flame retardant as component (B) and polytetrafluoroethylene as component (C), it promotes the dispersion of these components, prevents components (B) and (C) from depositing and adhering on the surface of metal such as a mold during molding or standing at a high temperature, exhibits a mold releasing action on the composition of the present invention remarkably superior to that attained by other releasing agents generally known to the art, and shortens the molding cycle, so that it becomes possible to conduct further improved high cycle molding.

The amine or amide stabilizer as component (F) is an amine or an amide compound having an aromatic group and preferably a phenylamine, an amine or amide compound having, in its molecule, an amido or sterically kindering phenolic group. Examples of component (F) include N,N'-hexamethylenebis(3 5-di-tert-butyl-4hydroxyhydrocinnamide), N,N'-bis[3-(3, 5-di-tert-butyl-4-hydroxyphenyl)propionyl] hydrazine, N-phenyl-N'-isopropyl-p-phenylenediamine, N,N'-diphenyl-p-phenylenediamine, 4,4'-bis(4-α,α-dimethylbenzyl) diphenylamine, N-phenylnapththylamine, and N,N'-di-β-naphthylphenylenediamine. They may be used alone or in a combination of two or more of them. Among them, N,N'-hexamethylenebis(3,5-di-tert-butyl-4-hydroxyhydrocinnamide, N,N'-bis[3-(3, 5-di-tert-butyl-4-hydroxyphenyl)propionyl]hydrazine, and 4,4'-bis(4-α,α-dimethylbenzyl)diphenylamine are particularly preferable.

In the present invention, these amine or amide stabilizers are used in an amount of 0.01 to 5% by weight, preferably 0.05 to 2% by weight based on the composition and effective in improving not only the thermal stability of the composition but also the prevention of staining of a metal.

These amine or amide stabilizers suppress the decomposition of the composition of the present invention, particularly components (B) and (C) per se and has a synergistic effect of suppressing the decomposition of PBT by component (B), which not only contributes to an improvement in the molding efficiency through prevention of the corrosion and staining of the mold during molding but also prevents the corrosion and staining of metal in contact with the molded article of electrical components etc. wherein the molded article is used at a high temperature.

The composition of the present invention may further contain a small amount of thermoplastic resin(s) as an auxiliary additive. For example, it is also possible to incorporate the following thermoplastic resins in any proportion according to the intended purpose: ethylene-acrylic ester copolymer, polyamide, polyacetal, polystyrene, styrene-butadiene copolymer, styrene-butadiene-acrylonitrile copolymer, styrene-butadiene-acrylic acid (or an ester thereof) copolymer, styrene-acrylonitrile copolymer, polycarbonate, polyurethane, polyphenylene oxide, polyphenylene sulfide, polybutadiene, halogenated polyolefin, polyvinyl halide, butyl rubber, and multilayer graft copolymer mainly composed of polyacrylate.

It is a matter of course that in order to impart a desired property to the composition of the present invention according to the intended purpose, the composition of the present invention may be compounded with additives known to the art, e.g., additives other than the above-described components, such as lubricants, nucleating agents, mold releasing agent, antistatic agents, surfactants, plasticizers, colorants, thermal stabilizers, and ultraviolet stabilizers.

The composition of the present invention can be prepared by making use of known equipment and processes commonly employed in the preparation of the conventional resin composition. Examples of the process include (i) one which comprises mixing the individual components, milling and extruding the mixture with an extruder to prepare pellets, and then conducting molding; (ii) one which comprises preparing pellets each different in the composition, mixing them in predetermined amounts and molding the mixture to prepare a predetermined molded article; and (iii) one in which a molding machine is directly charged with at least one of the components. Further, in order to attain homogeneous compounding of the components, it is preferable to employ a process which comprises pulverizing part of the resin components into fine powders and mixing them with the other components.

The flame-retardant PBT resin composition of the present invention is molded into various molded articles which are required to have flame retardancy, and are very useful when used in electrical components, particularly electrical and electronic parts having an electric contact made of metal, such as switches and relays.

The PBT composition of the invention has well-balanced functions by virtue of an effective improvement in the following characteristics.

(1) Since the composition brings about no deposition on the surface of a mold during molding and has excellent thermal stability, not only the mold is less susceptible to corrosion by a decomposition product or the like but also fabrication efficiency can be improved.

(2) The molded article is less susceptible to thermal deterioration.

(3) There occurs no spots having different colors on the molded article.

(4) The composition is excellent in the flame retardancy, and oozing of the flame retardant hardly occurs during use thereof.

(5) The composition is excellent in the mechanical properties such as tensile characteristics and Izod impact strength.

(6) The composition exhibits excellent flow and high rate of solidification and can shorten the molding cycle, so that it becomes possible to realize high cycle molding.

(7) The corrosion or staining of a coexisting metal (contact) during use of the composition can be effectively prevented.

EXAMPLES

In the Examples, the evaluation of the characteristics were conducted by the following methods. (1) Measurement of physical properties tensile test: according to ASTM D 638
Izod impact strength: according to ASTM D 256

(2) Residence test (thermal stability)

A sample was allowed to stay within a cylinder of a molding machine at a cylinder temperature of 260° C. for 30 min and then molded into a specimen. The molded specimen was subjected to a tensile strength test to evaluate the thermal stability and deterioration of the sample.

(3) Combustion test (UL-94)

Tests on the flame retardancy and the dripping of the resin during combustion were conducted by making use of five specimens (thickness: 1/32 in.) according to the Subject 96 (UL94) of Underwriters' Laboratories.

(4) Measurement of flow

Molding was conducted under the following conditions by making use of a test mold for measurement of rod flow length (cavity: 20 mm in width×2.0 mm in thickness), and the flow was evaluated based on the flow length (the length of the molded article):

molding conditions:
cylinder temperature: 250° C.
injection pressure: 1,000 kg/cm$^2$
mold temperature: 60° C.

(5) Critical molding cycle

A molded article having a cylindrical bottom (outer diameter: 40 mm$\phi$; height: 40 mm; average thickness: 5 mm) was molded under the following conditions to determine the critical time (sec) for molding cycle capable of providing a molded article having an excellent appearance. The smaller the numerical value, the better the high cycle moldability.

Molding conditions:
cylinder temperature: 250° C.
injection pressure: 1,400 kg/cm$^2$
mold temperature: 90° C.
molding cycle: injection-holding time was kept constant to determine cooling time.

(6) Visual inspection of molded article

A disk (100 mm$\phi$; thickness: 3 mm) was molded and observed with the naked eye with respect to the occurrence and the number of spots having different colors and oozing after being left to stand at 120° C. for 72 hr. Evaluation was made based on the following criteria:

| | | | |
|---|---|---|---|
| spot | ○ | free | |
| | Δ | small number of spots | |
| | X | many spots | |
| oozing | ○ | free | |
| | Δ | small degree of oozing | |
| | X | large degree of oozing | |

(7) Evaluation of staining of metal

A sample (pellet) was sufficiently dried. Thereafter, 20 g of the pellets were sealed in a glass tube together with a silver piece (15 mm×2 mm×0.2 mm) and heated at 150° C. for 300 hr to measure the electrical resistance of the silver piece with a milli-ohmmeter.

EXAMPLES 1 TO 9 AND COMPARATIVE EXAMPLES 1 TO 11

The components shown in the Table was mixed with polybutylene terephthalate, and a pelletized composition was prepared therefrom by making use of an extruder. The above-described evaluation was conducted with respect to the pellets thus prepared and various specimens prepared from the pellets by injection molding.

The results are shown in Table 1.

TABLE 1

| | | unit | Ex. 1 | Comp. Ex. 1 | Comp. Ex. 2 | Comp. Ex. 3 | Ex. 2 | Comp. Ex. 4 | Comp. Ex. 5 |
|---|---|---|---|---|---|---|---|---|---|
| composition | (A) polybutylene terephthalate | wt % | 80.5 | 80.5 | 80.5 | 75.0 | 80.2 | 80.2 | 80.7 |
| | (B) | | | | | | | | |
| | halogenated bisimide *1 | " | 13.0 | — | — | 13.0 | 13.0 | — | 13.0 |
| | brominated polycarbonate | " | — | 13.0 | — | — | — | 13.0 | — |
| | decabromodiphenyl ether | " | — | — | 13.0 | — | — | — | — |
| | antimony trioxide | " | 5.0 | 5.0 | 5.0 | 5.0 | 5.0 | 5.0 | 5.0 |
| | (C) | | | | | | | | |
| | polytetrafluoroethylene | " | 0.5 | 0.5 | 0.5 | — | 0.5 | 0.5 | — |
| | asbestos | " | — | — | — | 6.0 | — | — | — |
| | (D) glass fiber | " | — | — | — | — | — | — | — |
| | (E) low-molecular polyethylene | " | 1.0 | 1.0 | 1.0 | 1.0 | 1.0 | 1.0 | 1.0 |
| | (F) stabilizer *2 | " | — | — | — | — | 0.3 | 0.3 | 0.3 |
| quality (physical properties) | tensile strength | kg/cm$^2$ | 545 | 533 | 542 | 548 | 542 | 536 | 538 |
| | tensile elongation | % | 12 | 10 | 11 | 8 | 12 | 11 | 10 |
| | Izod impact strength (notched) notch side | kg·cm/cm | 3.4 | 3.0 | 3.0 | 2.9 | 3.6 | 3.2 | 3.0 |
| | anti-notch side | kg·cm/cm | 27 | 22 | 20 | 20 | 26 | 21 | 20 |
| | residence test residence time: 30 min (tensile strength) | kg/cm$^2$ | 245 | 173 | 193 | 208 | 266 | 190 | 221 |
| | combustion test (UL-94) | — | V-0 | V-0 | V-0 | V-0 | V-0 | V-1 | V-2 |
| | number of drips | drips | 0 | 0 | 0 | 0 | 0 | 2 | 5 |
| | critical molding cycle (cooling time) | sec | 14 | 21 | 22 | 16 | 14 | 21 | 17 |
| | flow | mm | 590 | 485 | 510 | 450 | 600 | 490 | 485 |
| | visual inspection spot | — | ○ | Δ | Δ | X | ○ | Δ | ○ |
| | oozing | — | ○ | ○ | Δ | X | ○ | ○ | ○ |
| | electrical resistance (silver piece) | mΩ | 39 | 130 | 110 | 37 | 19 | 39 | 25 |

| | | unit | Ex. 3 | Ex. 4 | Ex. 5 | Ex. 6 | Ex. 7 | Ex. 8 | Ex. 9 |
|---|---|---|---|---|---|---|---|---|---|
| composition | (A) polybutylene terephthalate | wt % | 72.5 | 57.5 | 52.5 | 52.9 | 56.5 | 57.2 | 56.2 |
| | (B) | | | | | | | | |
| | halogenated bisimide *1 | " | 7.0 | 7.0 | 12.0 | 12.0 | 7.0 | 7.0 | 7.0 |
| | brominated polycarbonate | " | — | — | — | — | — | — | — |
| | decabromodiphenyl ether | " | — | — | — | — | — | — | — |
| | antimony trioxide | " | 5.0 | 5.0 | 5.0 | 5.0 | 5.0 | 5.0 | 5.0 |
| | (C) | | | | | | | | |
| | polytetrafluoroethylene | " | 0.5 | 0.5 | 0.5 | 0.1 | 0.5 | 0.5 | 0.5 |
| | asbestos | " | — | — | — | — | — | — | — |
| | (D) glass fiber | " | 15 | 30 | 30 | 30 | 30 | 30 | 30 |
| | (E) low-molecular polyethylene | " | — | — | — | — | 1.0 | — | 1.0 |
| | (F) stabilizer *2 | " | — | — | — | — | — | 0.3 | 0.3 |
| quality (physical properties) | tensile strength | kg/cm$^2$ | 1060 | 1430 | 1460 | 1400 | 1430 | 1420 | 1425 |
| | tensile elongation | % | 3.2 | 2.4 | 2.4 | 2.5 | 2.5 | 2.5 | 2.6 |
| | Izod impact strength (notched) notch side | kg·cm/cm | 5.6 | 8.5 | 5.7 | 8.5 | 8.8 | 5.6 | 8.7 |
| | anti-notch side | kg·cm/cm | 40 | 65 | 66 | 64 | 70 | 65 | 68 |
| | residence test residence time: 30 min (tensile strength) | kg/cm$^2$ | 108 | 1090 | 1020 | 1020 | 1070 | 1120 | 1180 |
| | combustion test (UL-94) | — | V-0 | V-0 | V-0 | V-0 | V-0 | V-0 | V-0 |
| | number of drips | drips | 0 | 0 | 0 | 0 | 0 | 0 | 0 |
| | critical molding cycle (cooling time) | sec | 9 | 9 | 9 | 9 | 9 | 9 | 8 |
| | flow | mm | 303 | 270 | 249 | 253 | 283 | 268 | 279 |
| | visual inspection spot | — | ○ | ○ | ○ | ○ | ○ | ○ | ○ |
| | oozing | — | ○ | ○ | ○ | ○ | ○ | ○ | ○ |
| | electrical resistance (silver piece) | mΩ | 20 | 22 | 24 | 23 | 21 | 16 | 15 |

| | | unit | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|
| composition | (A) polybutylene terephthalate | wt % | 57.5 | 57.5 | 56.5 | 58.0 | 54.0 | 52.7 |
| | (B) | | | | | | | |
| | halogenated bisimide *1 | " | — | — | — | 7.0 | 7.0 | — |
| | brominated polycarbonate | " | 7.0 | — | — | — | — | — |
| | decabromodiphenyl ether | " | — | 7.0 | 7.0 | — | — | 7.0 |
| | antimony trioxide | " | 5.0 | 5.0 | 5.0 | 5.0 | 5.0 | 5.0 |
| | (C) | | | | | | | |
| | polytetrafluoroethylene | " | 0.5 | 0.5 | 0.5 | — | — | — |
| | asbestos | " | — | — | — | — | 4.0 | 4.0 |
| | (D) glass fiber | " | 30 | 30 | 30 | 30 | 30 | 30 |
| | (E) low-molecular polyethylene | " | — | — | 1.0 | — | — | 1.0 |
| | (F) stabilizer *2 | " | — | — | 6.3 | — | — | 0.3 |

TABLE 1-continued

| quality (physical properties) | | | | | | | | | |
|---|---|---|---|---|---|---|---|---|---|
| | tensile strength | | kg/cm² | 1350 | 1370 | 1380 | 1430 | 1460 | 1430 |
| | tensile elongation | | % | 2.2 | 2.3 | 2.4 | 2.0 | 1.6 | 1.5 |
| | Izod impact strength | notch side | kg·cm/cm | 3.0 | 8.0 | 3.1 | 6.5 | 7.5 | 7.0 |
| | (notched) | anti-notch side | kg·cm/cm | 42 | 46 | 45 | 40 | 50 | 40 |
| | residence test residence time: 30 min (tensile strength) | | kg/cm² | 702 | 781 | 883 | 815 | 903 | 887 |
| | combustion test | (UL-94) | — | V-1 | V-0 | V-0 | V-2 | V-0 | V-0 |
| | | number of drips | drips | 1 | 0 | 6 | 5 | 0 | 0 |
| | critical molding cycle | (cooling time) | sec | 14 | 14 | 14 | 12 | 12 | 14 |
| | flow | | mm | 220 | 229 | 230 | 225 | 201 | 208 |
| | visual inspection | spot | — | Δ | Δ | Δ | Δ | X | X |
| | | oozing | — | ○ | X | X | ○ | ○ | X |
| | electrical resistance (silver piece) | | mΩ | 80 | 75 | 35 | 27 | 28 | 39 |

*1: ethylenebistetrabromophthalimide
*2: 4,4'-bis(4-α,α-dimethylbenzyl)diphenylamine

What is claimed is:

1. A flame-retardant polybutylene terephthalate resin composition comprising, based upon the total weight of the composition:
   (A) a polybutylene terephthalate base resin;
   (B) 0.5 to 25% by weight of a halogenated bisimide represented by the general formula:

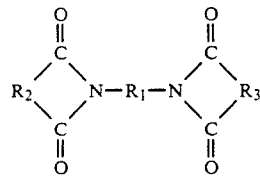

wherein $R_1$ is a divalent organic group and $R_2$ and $R_3$ are each a divalent organic group, provided that at least one of $R_2$ and $R_3$ has at least one halogen atom;
   (C) 0.05 to 5% by weight of a polytetrafluoroethylene resin;
   (D) 0 to 60% by weight of an inorganic filler; and
   (E) 0.05 to 5% by weight of a low molecular weight polyethylene.

2. A flame-retardant composition as in claim 1, wherein said polybutylene terephthalate base resin is a polybutylene terephthalate homopolymer or a polybutylene terephthalate copolymer having at least 80% by weight of polybutylene terephthalate units.

3. A flame-retardant composition as in claim 1 or 2, wherein said halogenated bisimide is an alkylenebistetrabromophthalimid.

4. A flame-retardant composition as in claim 1 or 2, which further comprises:
   (F) 0.01 to 5% by weight of at least one amine or amide stabilizer.

5. A molded article for electrical components prepared by molding a composition according to claim 1 or 2.

* * * * *

UNITED STATES PATENT AND TRADEMARK OFFICE
CERTIFICATE OF CORRECTION

PATENT NO. : 5,043,371

DATED : August 27, 1991

INVENTOR(S) : NAKANO et al

It is certified that error appears in the above-identified patent and that said Letters Patent is hereby corrected as shown below:

Column 1, line 25, after "as" delete "well as";
         line 52, after "is" change "kindered" to --hindered--;
         line 56, after "stain" delete "a".

Column 2, line 14, after "to a" delete "before "flame-retardant";"
         line 19, after "cycle" delete "and the realization of the" and insert --(thereby realizing--;
         line 20, after "molding" insert --)--.

Column 4, line 3, after "invention," delete "ti" and insert --it--;
         line 4, before "B)" insert --(--;
         line 35, after "attained in" delete "the";
         line 45, change "substance" to --substances--.

Column 5, line 42, change "clone" to --alone--.

Column 6, line 20, after "which" delete "are poor" and after "itself" delete "in the" and insert --exhibits poor--.

Column 9, line 4, after "Table" delete "was" and insert --were--.

Signed and Sealed this

Twentieth Day of April, 1993

*Attest:*

MICHAEL K. KIRK

*Attesting Officer*      *Acting Commissioner of Patents and Trademarks*